United States Patent [19]
Gaeddert et al.

[11] 3,968,632
[45] July 13, 1976

[54] MACHINE FOR FORMING ROUND BALES

[75] Inventors: Melvin Victor Gaeddert, Newton; Bobby Dwayne McWhirt, Hesston, both of Kans.

[73] Assignee: Hesston Corporation, Hesston, Kans.

[22] Filed: Oct. 2, 1974

[21] Appl. No.: 511,215

[52] U.S. Cl. .................................................. 56/341
[51] Int. Cl.² ................................................ A01D 39/00
[58] Field of Search ................ 56/341, 343, 1, 16.4, 56/364; 172/19

[56] References Cited
UNITED STATES PATENTS

| | | | |
|---|---|---|---|
| 2,347,926 | 5/1944 | Paradise et al. | 56/364 |
| 3,585,791 | 6/1971 | Batog | 56/364 |
| 3,763,636 | 10/1973 | Bliss | 56/341 X |
| 3,792,574 | 2/1974 | Best | 56/341 |
| 3,815,344 | 6/1974 | Kucera | 56/341 |

*Primary Examiner*—J.N. Eskovitz
*Attorney, Agent, or Firm*—Schmidt, Johnson, Hovey & Williams

[57] ABSTRACT

A machine for producing large round bales passes over loose hay on the ground, picks up the hay adjacent the rear of the machine and coils the hay within a forming chamber as the bale is rolled along the ground to progressively grow in size until reaching its final dimensions, whereupon the bale is tied and the endgate of the machine raised to discharge the finished bale. Pickup mechanism at the rear of the machine includes tined lifters mounted on a continuously moving, upright, endless web in such a manner that the lifters lie flatly against the web until moving around their lower limits of travel, whereupon they are projected outwardly and downwardly to sweep loose hay forwardly from the ground and into the forming chamber. The height of the pickup mechanism relative to the ground surface may be varied by hydraulically raising the housing of the machine relative to its ground wheels, and elevation of the housing beyond a predetermined amount automatically releases the endgate latch and swings the endgate to its raised position for bale discharge. The expandable forming chamber within the housing can expand fore-and-aft, as well as vertically, by virtue of the fact that the front half of the arcuate top of the chamber is suspended by upright, swingable hangers from adjacent the top of the housing.

29 Claims, 8 Drawing Figures

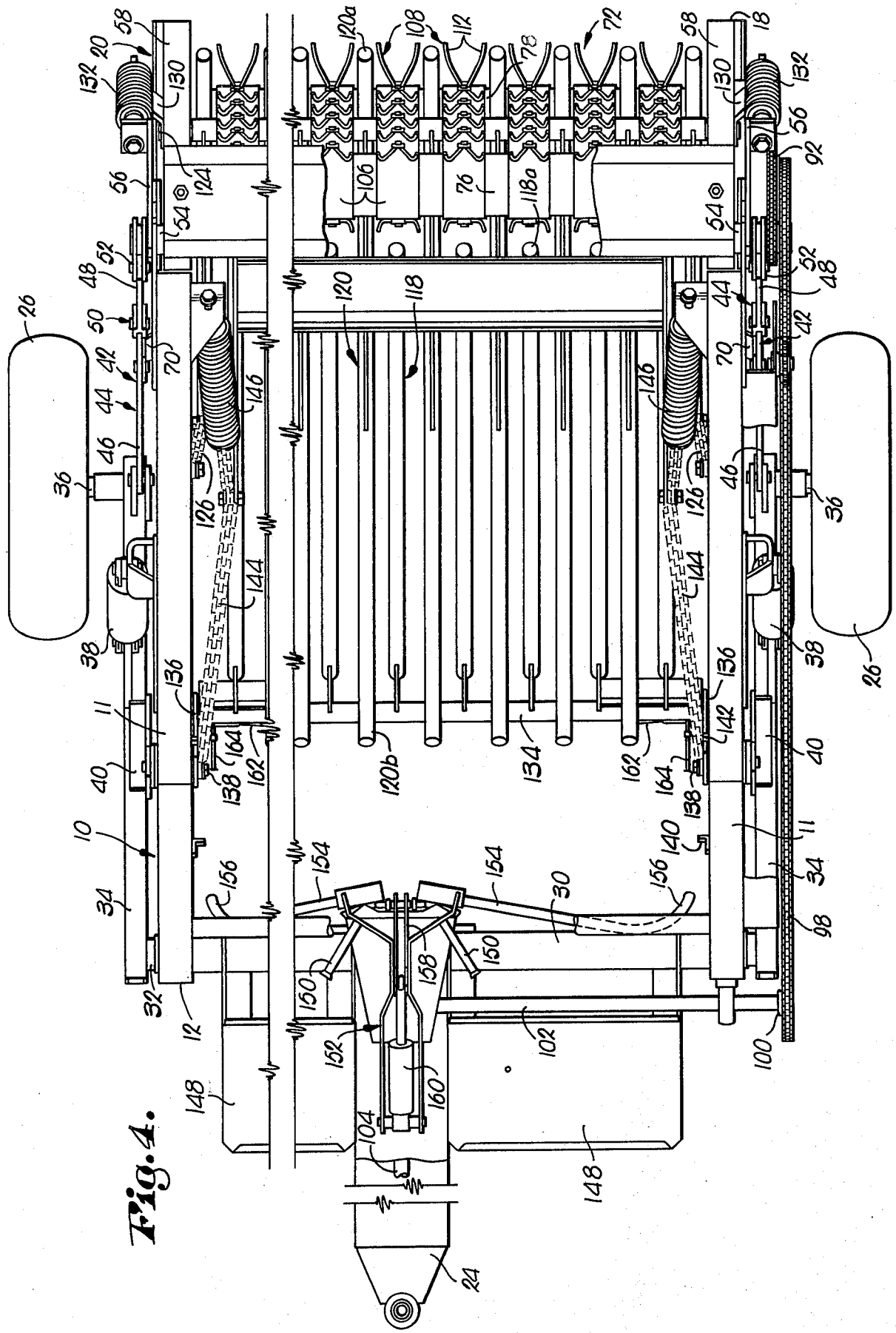

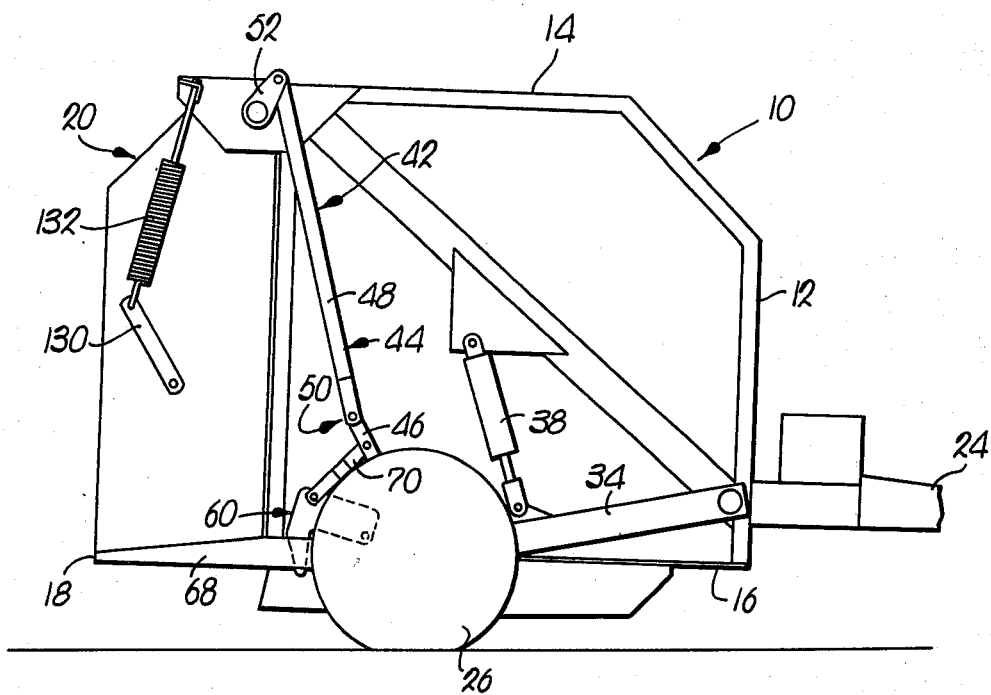
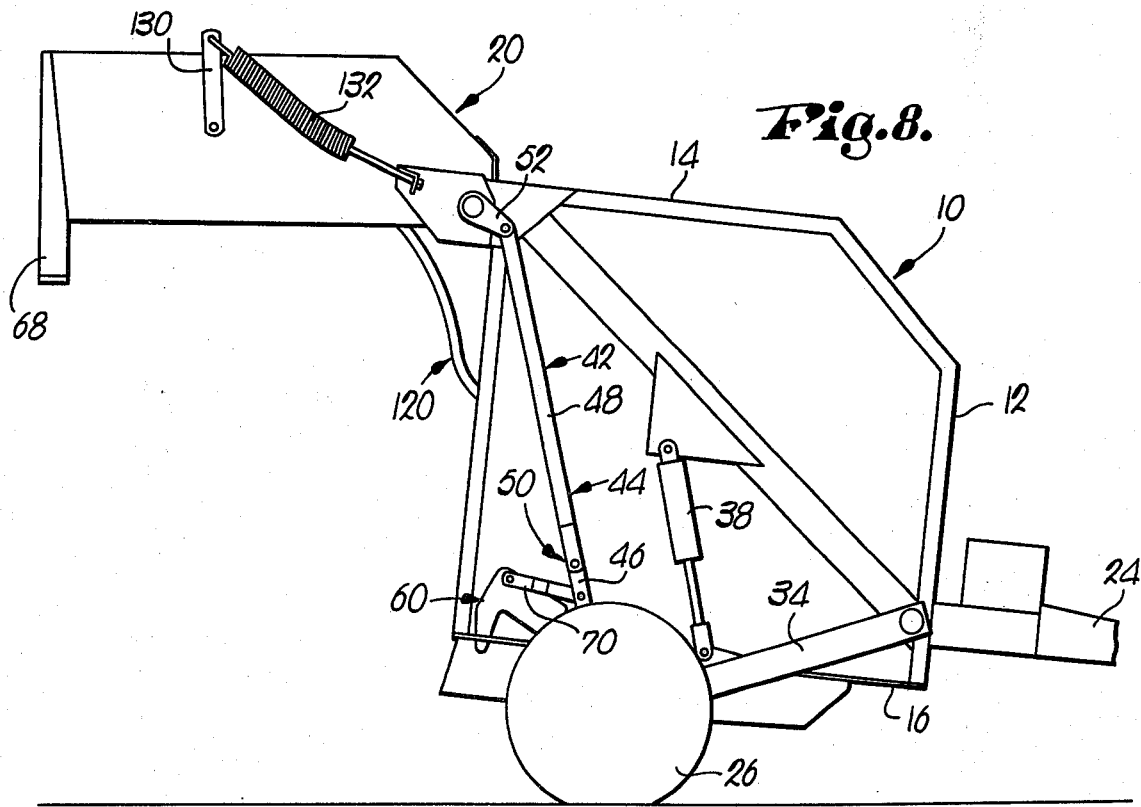

MACHINE FOR FORMING ROUND BALES

This invention relates broadly to the field of hay handling and, more particularly, to the formation of relatively large cylindrical hay bales, commonly referred to in the industry as "round" bales. Hence, the description which follows is couched in terms of round bales, although it is to be understood that such terminology does in fact refer to cylindrical bales having circular or round cross sections. Moreover, the present invention relates to that class of large round balers wherein a bale is formed by rolling a mass of hay along ground covered with loose hay so as to coil or roll up the bale as the latter is pushed along the ground.

One important object of the present invention is to provide vastly improved pickup mechanism in a ground roll baler which avoids many of the breakage, bale damage, and maintenance problems inherent in previous machines of this class which utilized pickup structure in the nature of rotating, multipronged plates or wheels. In rocky conditions such "star wheels" proved to be highly susceptible to bending and breakage, and the sharp prongs of each wheel often tended to punch holes in the finished bale through which moisture could enter and ruin its quality.

Another important object of this invention is to provide a unique, low cost and labor-saving way to operate the endgate of the baler by making its actuation responsive to raising of the baler housing beyond a predetermined amount such that below that amount, the housing may be raised and lowered as need-be to position the height of the pickup mechanism relative to the ground in working or roading conditions, while above such amount, raising of the housing automatically effects opening of the endgate.

A further important object of this invention is to avoid any tendency for the first mass of each bale being manipulated in the forming chamber of the machine to separate into separate pockets or cores of hay during the succeeding rolling action rather than coiling about a single, dense center in the intended manner to produce a uniformly round, rather than elliptical, bale.

An additional important object of this invention is to provide an expandable bale forming chamber, utilizing swingable front and rear, arcuate forming elements, which is capable of expanding not only vertically as the bale grows in size, but in a fore-and-aft direction as well, thereby contributing to avoidance of the problem mentioned in the foregoing object and assuring that properly directed pressure can be applied against the entire top half of the bale throughout its formation to give the finished bale high density and strong weather-shedding characteristics.

In the drawings:

FIG. 4 is a top plan view of the machine;

FIG. 5 is an enlarged, fragmentary view of one of the lifting tines of the pickup mechanism;

FIG. 6 is a fragmentary, cross-sectional view of a lifting tine taken along line 6—6 of FIG. 5;

FIG. 7 is a schematic view of the opposite side of the machine on a reduced scale illustrating the machine in condition for roading; and FIG. 8 is a schematic view similar to FIG. 7 but showing the endgate fully opened.

Figure 1:
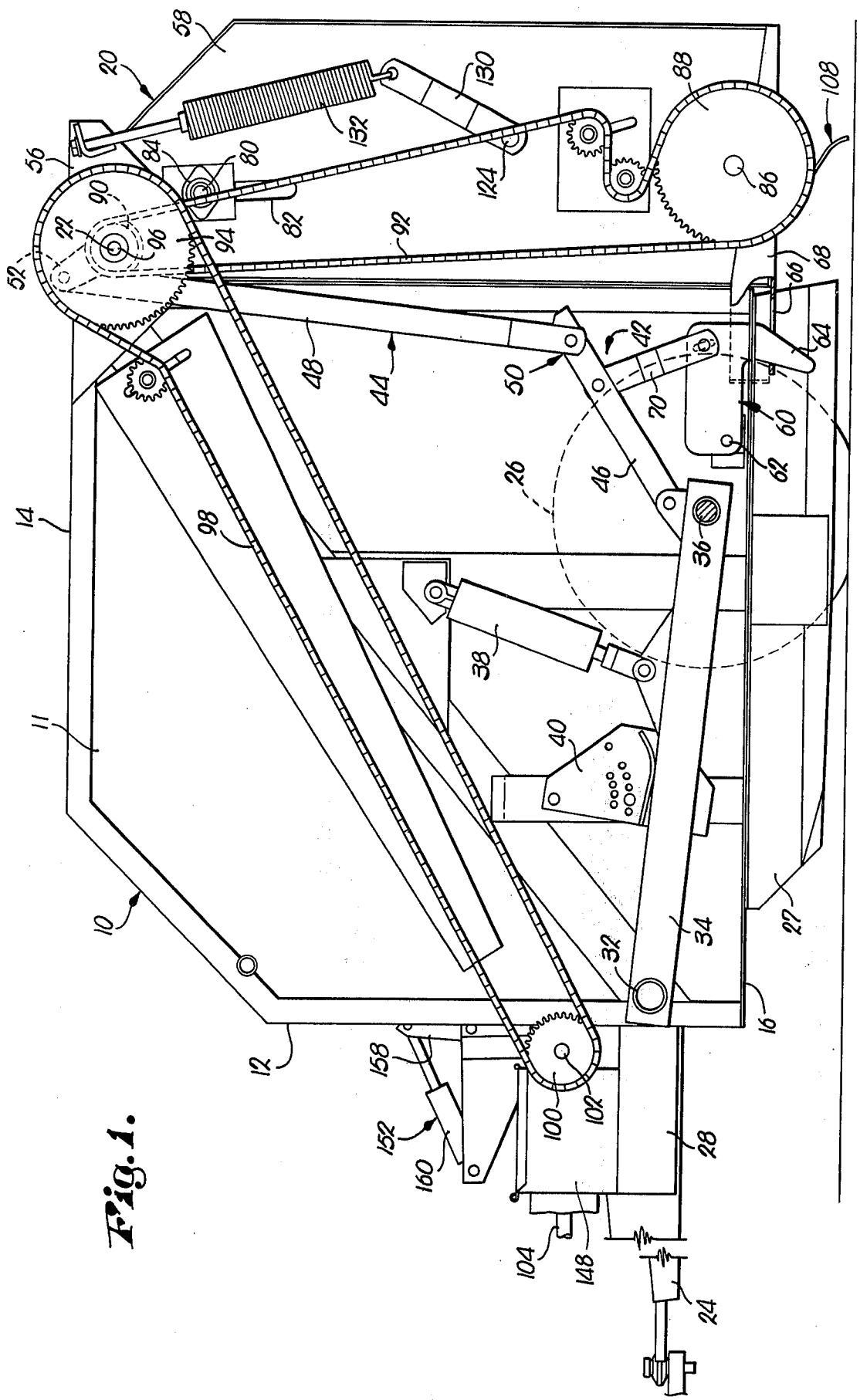
FIG. 1 is a side elevational view of a machine for forming large round bales constructed in accordance with the teachings of the present invention, the endgate being shown in its fully closed position and the housing fully lowered to its normal working height.

The baling machine of the present invention has a box-like housing 10 provided with opposed sidewalls 11, open along its front 12, top 14, bottom 16, and normally closed at its rear 18 by an endgate 20 which may be swung about a horizontal axis at 22 between a position fully closing the rear 18 of housing 10 as shown, for example, in FIG. 1, and a position fully opening rear 18 as shown in FIG. 8. A tongue 24 at the front 12 of housing 10 adapts the latter for coupling with a towing vehicle (not shown), and a pair of ground wheels 26 on opposite sides of housing 10 adapt the latter for advancement across a field. Depending, fore-and-aft extending shields 27 on each sidewall 11 along bottom 16 help confine loose hay as housing 10 passes thereover during operation.

The housing 10 is secured to a forwardmost frame 28 at the rear of tongue 24 which includes a cross pipe 30 (FIGS. 3 and 4) extending transversely of the normal path of travel of the machine across the front 12 of housing 10 adjacent bottom 16. Pipe 30 rotatably houses a tube 32 which projects outwardly beyond opposite sidewalls 11 and is there rigidly secured to a pair of rearwardly extending lift arms 34 having stub shafts 36 at their rearmost ends which rotatably support the ground wheels 26. A fluid pressure piston and cylinder assembly 38 on each side respectively of housing 10 interconnects the corresponding lift arm 34 and the corresponding sidewall 11 to provide powered raising and lowering of housing 10 when assemblies 38 are actuated. The lower limit of housing 10 is defined by an adjustable stop plate 40 for each arm 34 respectively which engages its arm 34 when housing 10 is fully lowered as in FIG. 1.

Opening and closing of endgate 20 is controlled by apparatus 42 on each side respectively of housing 10 which includes lost motion linkage 44 that interconnects the rearmost end of the corresponding lift arm 34 and endgate 20. More specifically, each linkage 44 is articulated having a pair of links 46 and 48 which are pivotally interconnected to form a joint 50, the lower link 46 being pivotally connected to its lift arm 34 and the upper link 48 being pivotally connected at its upper end to a crank 52 also forming a part of each apparatus 42. Each crank 52 is rigidly affixed to a transversely extending stub pipe 54 that is rotatable within a gusset 56, yet is rigidly secured to a proximal sidewall 58 of endgate 20 such that operation of cranks 52 effects swinging of endgate 20 about the horizontal axis 22 defined by stub pipes 54.

Each linkage 44 is of such a length that joint 50 is bent when housing 10 is fully lowered as shown in FIG. 1. Consequently, extension of the piston and cylinder assemblies 38 to raise housing 10 has the effect of straightening joints 50, but such movement has no effect upon endgate 20 unless cylinders 38 continue to be actuated beyond that point at which the joints 50 become fully straightened. Hence, a degree of lost motion is involved insofar as actuation of endgate 20 is concerned, as the linkages 44 are buckled and unbuckled during raising and lowering of housing 10 to a limited extent.

Each side of the housing 10 is provided with a latch 60 for endgate 20 which is also controlled by manipulation of the lift arms 34. Each latch 60 has a pivotal connection 62 at its forwardmost end to the proximal sidewall 11 and is provided with an integral, depending tongue 64 at its rearmost end that is adapted to be received within an elongated slot 66 (FIG. 1) within a forwardly projecting bar 68 on endgate 20. A short link 70 operably connects each latch 60 respectively with the lower link 46 of corresponding linkage 44 such that movement of the linkages 44 is transmitted directly to the latches 60. As illustrated, each tongue 64 is considerably prolongated such that it remains within slot 66 of the corresponding bar 68 during considerable movement of linkage 44. In this respect the tongues 64 remain within their slots 66 at least until the linkages 44 are in the condition illustrated in FIG. 7, where they are slightly buckled, and housing 10 is raised significantly to facilitate roading. As each joint 50 is straightened beyond the condition in FIG. 7 and its linkage 44 unbuckles, however, the corresponding latch 60 releases endgate 20 so that the latter can be fully raised to its FIG. 8 position upon continued extension of the piston and cylinder assemblies 38.

Figure 2:
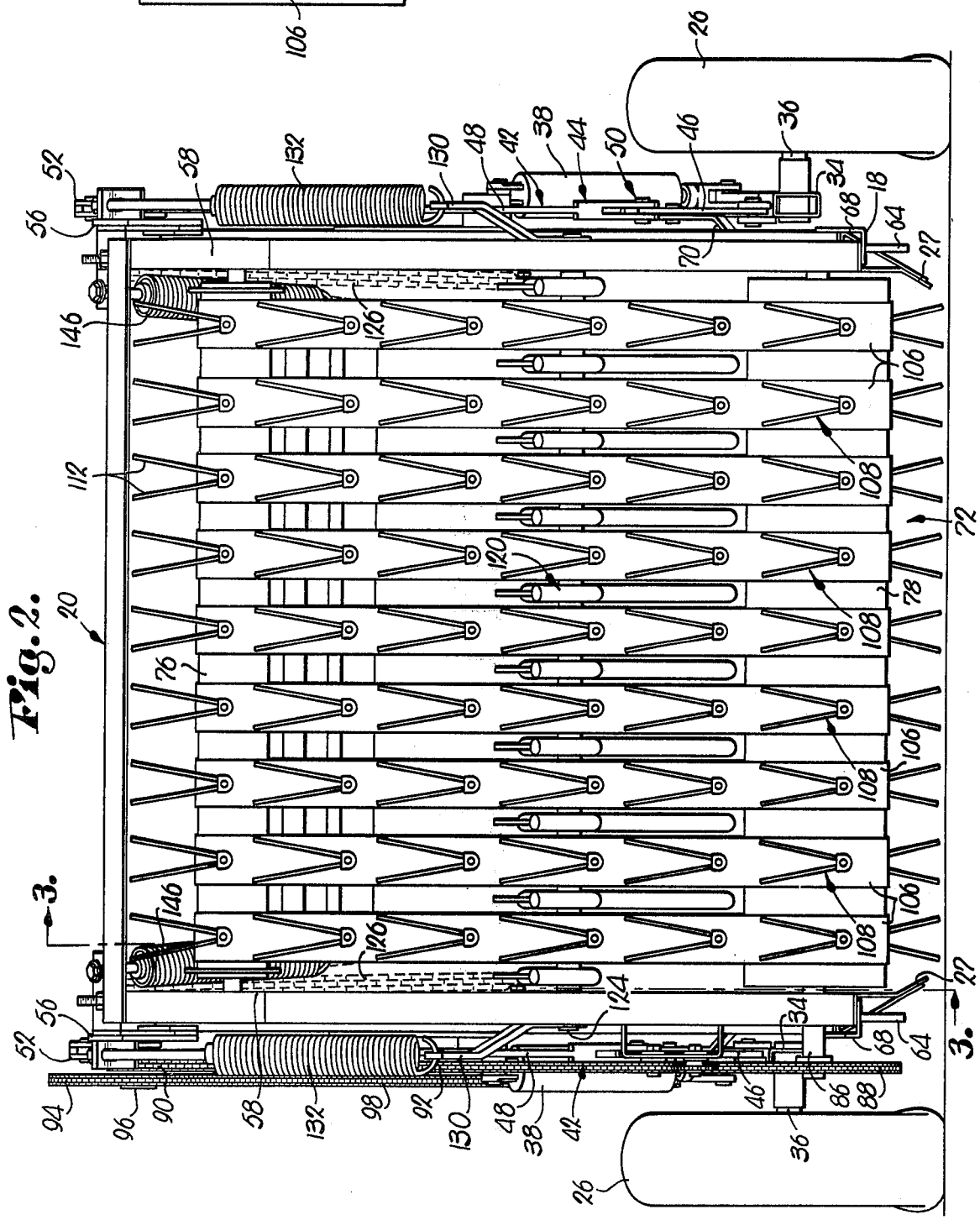
FIG. 2 is an elevational view of the rear of the machine.

The endgate 20 carries pickup mechanism 72 that is essential not only in raising loose hay from the ground as housing 10 passes thereover, but is also important in imparting a rolling action to the mass of hay that is being formed into a bale within the housing 10. Mechanism 72 includes a pair of upper and lower rotatable drum members 76 and 78 which span the endgate 20 and are supported by its sidewalls 58 for rotation about horizontal axes transverse to the normal path of travel of housing 10. The upper drum 76 has a central shaft 80 extending through a vertically disposed slot 82 in each sidewall 58 and supported at its outer ends by bearings 84 (FIG. 1, only one being shown) which are releasably secured to sidewalls 58 to permit vertical adjustment of shaft 80 within slots 82. The lower drum 78 has a central shaft 86 which is journaled for rotation by suitable bearings (not shown) within sidewalls 58, and shaft 86 projects outwardly beyond the left sidewall 58 (viewing FIG. 2) where it is affixed to a large sprocket 88 (FIGS. 1, 2 and 4). Sprocket 88 is in turn drivingly coupled with a smaller upper sprocket 90 on sidewall 58 by an endless chain 92. The small sprocket 90 is part of a double sprocket which also includes a larger outer sprocket 94 mounted on a common shaft 96 which is concentric to and rotatable within the corresponding stub pipe 54 associated with crank 52. A long, fore-and-aft extending, continuous drive chain 98 drivingly couples large sprocket 94 with another sprocket 100 at the front 12 of housing 10 which is carried by a transverse shaft 102 that makes a right-angle connection (not shown) to a main fore-and-aft extending input shaft 104 couplable with the power takeoff mechanism or the like of the towing vehicle.

Mechanism 72 further includes a flexible, continuous web looped around drums 76 and 78 in the nature of a plurality of side-by-side flexible belts 106. Each continuous belt 106 carries a series of bifurcated, elongated lifters 108, each of which is fastened at one end only to its belt 106 by a fastener 110 (detailed in FIGS. 5 and 6). Each lifter 108 normally lies flatly against its belt 106 and is held rather tightly there-against by its fastener 110, but the opposite end of each lifter 108 is free to move outwardly with respect to the surface of its belt 106. Hence, as illustrated best in FIG. 3, the lifters 108 are caused to be projected outwardly from their belts 106 at their free ends as lifters 108 moves around lower drum 78, and such outward projection continues until the lifters 108 are again positioned along a flat stretch of their belt 106 rather than an arcuate stretch around drum 78. Drum 78 is rotated in a clockwise direction viewing FIGS. 1 and 3, and hence the rearmost stretches of belts 106 are moving downwardly while the forwardmost stretches thereof are moving upwardly such that the lifters 108 are caused to sweep forwardly and upwardly about drum 78 when they are adjacent the ground as shown in FIG. 3.

Each lifter 108 is generally V-shaped, having a pair of tines 112 which converge toward their fastener 110 and are interconnected therebeneath by a bight 114 (FIG. 6). The opposite ends of tines 112 terminate in out-turned tips 116 that insure aggressive sweeping and raking action as the tines 112 move around lower drum 78.

Figure 3:
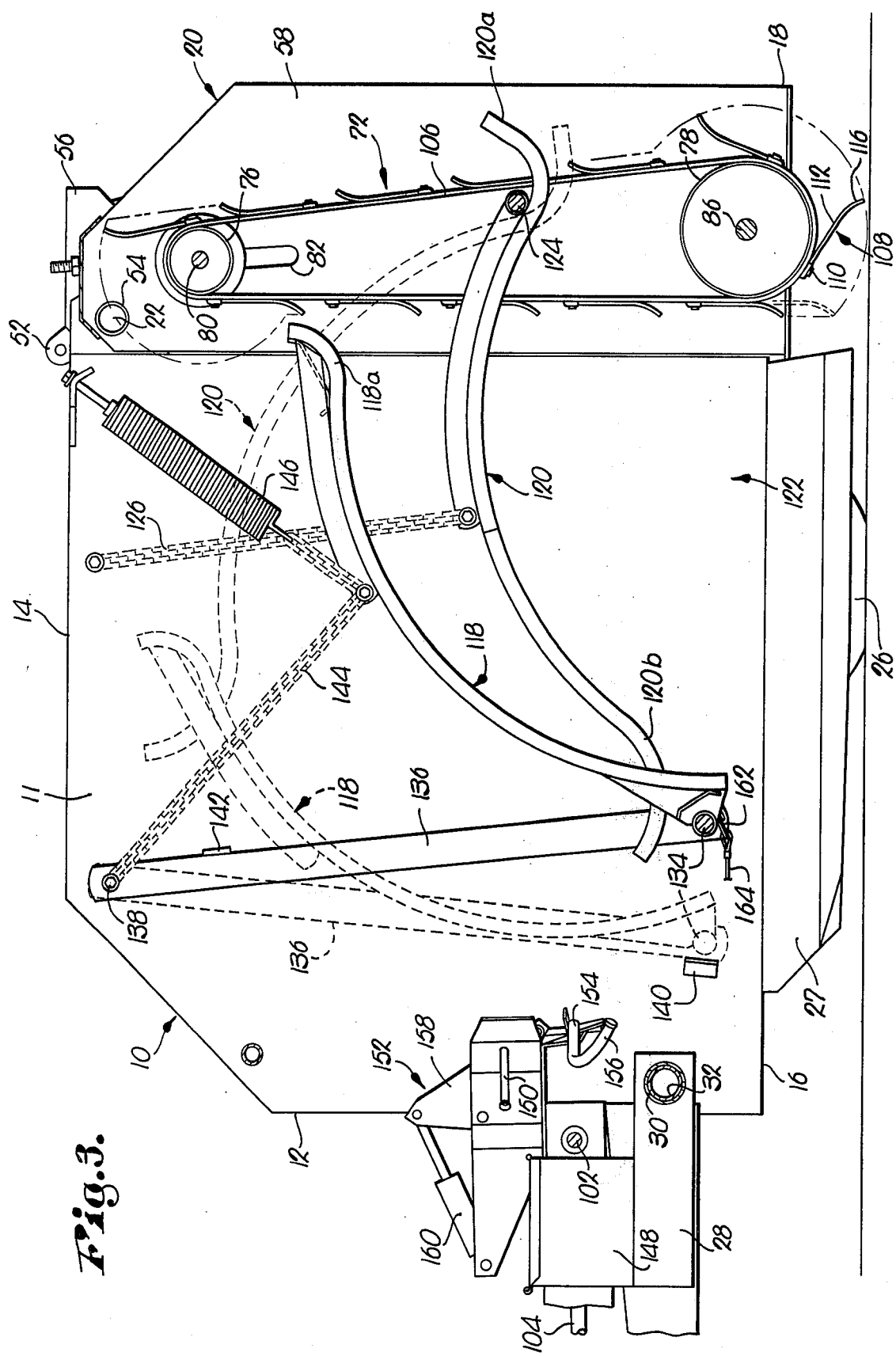
FIG. 3 is a vertical, cross-sectional view through the machine taken along line 3—3 of FIG. 2 and showing alternative positions of the front and rear forming grates in dashed lines.

With particular reference to FIGS. 3 and 4, it may be seen that the interior of housing 10 contains a pair of upwardly concave, bale-forming grate elements 118 and 120 which together form the arcuate top of an expandable forming chamber 122 below grates 118, 120, ahead of mechanism 72, and above open bottom 16. The rear grate 120 is mounted for swinging movement about a transversely extending, horizontal shaft 124, that is supported by the opposed sidewalls 58 of endgate 20, the bulk of grate 120 thus extending forwardly from mechanism 72. Rear grate 120 is provided with an upturned rearmost extremity 120a that extends rearwardly between adjacent belts 106 to maintain the same in separated relationship to one another, while the front of rear grate 120 is provided with a similarly upturned forwardmost extremity 120b. A pair of limit chains 126 restrict downward swinging of rear grate 120 beyond its full line position shown in FIG. 3, and a pair of external cranks 130 (best seen in FIGS. 1 and 2) are fixed to the outermost ends of shaft 124 and are coupled with tension springs 132 to yieldably bias rear grate 120 downwardly against the lower stop provided by limit chain 126.

Front grate 118, on the other hand, while being configured somewhat similarly to rear grate 120 in that it is also provided with an upturned, forwardmost extremity 118a, is swingably mounted on a transversely extending shaft 134 located adjacent bottom 16 which can itself be shifted fore-and-aft of housing 10 by virtue of elongated, upright hangers 136 on opposite ides of housing 10 which depend from upper pivots 138 in sidewalls 11. Hangers 136 are limited in their opposite extremes of fore-and-aft swinging movement by stops 140 and 142 secured to the sidewalls 11, and the front grate 118 is limited in the extent of downward swinging movement which it may make by virtue of a pair of limit chains 144. A pair of coiled tension springs 146 inclined downwardly and forwardly within housing 10 yieldably bias grate 118 downwardly toward bottom 16 and restrain the same with its hangers 136 against movement forwardly to the dashed line position shown in FIG. 3.

As can be clearly seen, the orientation of front grate 118, whose individual rods are interspersed between those of rear grate 120, is considerably more upright than rear grate 120. That is, as can be seen by comparing the solid line and dashed line positions of grate 118 as shown in FIG. 3, the disposition of front grate 118 throughout its operations is primarily vertical so as to form the front limit of the defined top of forming chamber 122. In its solid line position of FIG. 3, which is the condition during the most initial stages of bale formation, the shaft 134 of front grate 118 is disposed below front extremity 120b of rear grate 120 with the remaining portion of grate 118 extending upwardly through and beyond rear grate 120. In this condition, the front grate 118 thus foreshortens the top of forming chamber 122 which would extend forwardly to the front extremity 120b of rear grate 120 were it not for the presence of shaft 134 below forward extremity 120b at this particular time. As front grate 118 swings forwardly about shaft 134 and as hangers 136 swing forwardly about their pivots 138 to the dotted line position of FIG. 3, the foreshortened chamber 122 is expanded in a fore-and-aft direction as well as in a vertical direction.

The frame 28, located ahead of front 12 of housing 10, supports a pair of receptacles 148 which house cord or other suitable material for binding the finished bale before it leaves the forming chamber 122. Single strands of cord (not shown) are threaded through a pair of outwardly angled, generally fore-and-aft extending tubes 150 of tying mechanism 152 and thence into oppositely extending, normally horizontal, tubular guides 154 provided with rearwardly curved ends 156. The strands of cord hang freely from ends 156 and are brought toward and away from the central axis of the machine by guides 154 when the latter are swung downwardly about generally fore-and-aft axes into contiguous relationship with one another by a common rocker 158 which is operated by a hydraulic cylinder 160. Cylinder 160 may, if desired, be actuated by an electric motor (not shown) such that the tying mechanism 152 may be operated simply by throwing an appropriate switch.

OPERATION

Housing 10 is advanced in the lower position shown in FIGS. 1–4 over ground having loose hay lying thereon, preferably in a windrow. In this position the tines 112 of lifters 108 flip outwardly about their fasteners 110 and sweep in close proximity to the ground surface as they move around lower drum 78 in a clockwise direction viewing FIG. 3. Should it be necessary to adjust the position of tines 112 relative to the ground surface, such can be readily accomplished by merely actuating the piston and cylinder assemblies 38 to the extent necessary to raise housing 10 an appropriate amount.

As the open bottom 16 of housing 10 passes over loose hay the lifters 108 engage the hay and sweep it upwardly and forwardly into chamber 122. The downwardly and forwardly arched configuration of grate 120, coupled with the upwardly moving, forwardmost stretches of belts 106, cause the loose hay to roll forwardly as housing 10 continues to advance. At this critical time in the formation process, the front grate 118 is especially important, because its presence across the front of chamber 122 foreshortens the latter to such an extent that the loose mass of hay rolling within chamber 122 is maintained in a single core of material rather than separating into two or more separate groups. Hence, the bale grows in size about a single core to assume a truly circular cross-sectional configuration, rather than taking on an elliptical shape provided with bunches of material at opposite sides of the main circular mass. The latter arrangement is highly undesirable because a bale thus formed is difficult to retain against break up or cracking, with the result that moisture can readily enter the bale and ruin its quality. Moreover, the production of such an elliptical bale makes tying of the bale more difficult, as well as making the bale harder to roll smoothly along the ground during other handling.

It is also to be pointed out that springs 146 coupled with front grate 118 assure that substantial resistance to forward movement of the loose mass within chamber 122 is provided during the initial stages of bale formation. Pressure is applied by grate 118 not only downwardly against the bale, but also rearwardly against the same so that there is little tendency for the bale to assume other than a truly circular configuration during such initial stages. Moreover, the bale core is assured of being tightly packed, without undue fluffiness, which is highly important from the standpoint of producing a bale in the most efficient manner and with the best weather-shedding characteristics.

As the bale core begins to increase in size while rolling along the ground, firm pressure is continuously applied by the tension springs 132 and 146 such that growth of the bale is not unduly rapid which would lead to fluffiness in the finished bale. Rear grate 120 swings upwardly and rearwardly to make room within chamber 122 for the growing bale, and front grate 118 swings both upwardly about shaft 122 and forwardly with hangers 136 about pivots 138, thereby expanding chamber 122 both vertically and in a fore-and-aft direction. The entire top half of the bale is thereby firmly retrained throughout the formation process to produce a finished bale of the desired shape and density.

Should the lifters 108 encounters stones, stubble or the like during their movement around drum 78, such does not lead to damage or breakage as has heretofore been a consistent problem in previous machines utilizing "star wheel" type pickups. Instead, the lifters 108 simply yield rearwardly on their belts 106 or even twist to one side as required to allow the stones or stubble to pass rearwardly beyond endgate 20. In addition, it has been found after considerable field testing in rocky soil conditions that the lifters 108 do not pick up stones and other trash to be rolled into the bale as has heretofore been prevalent in prior machines. While lifters 108 are extremely effective in sweeping the loose hay forwardly and upwardly into the forming chamber 122, they are equally as effective in leaving behind the undesirable trash materials that otherwise serve only to lower the quality of the bale being formed.

After the bale has been coiled to the desired size and grates 118, 120 and hangers 36 have all swung to their respective outer limits, the bale is ready to be tied. Hence, as the last layer of hay is being coiled about the bale, the operator actuates hydraulic cylinder 160 to swing rocker 158 forwardly so as to bring the guides 154 downwardly into a generally vertical, contiguous relationship with one another. This presents the free ends of the binding cord to the loose hay as it is being rolled up onto the bale, thereby pulling the cord through guides 154 and initiating wrapping of the cord about the bale. The operator then directs the machine out of the loose hay onto a clear ground surface and continues to advance housing 10 such that the formed bale continues to roll within expanded chamber 122, causing the cord from guides 154 to be wound around the bale. As such winding takes place, the guides 154 are swung back and forth toward and away from the center of the machine by cylinder 160 so that the bale becomes wrapped not only at its center but also adjacent both ends. When the bale has been sufficiently wrapped with cord and the guides 154 are swung outwardly to their fullest extent, the cords will be disposed along shaft 134 of front grate 118 adjacent a pair of shiftable sickle sections 162. Actuation of sections 162 by a pair of cables 164 causes the cords to be severed, completing the tying procedure.

In order to discharge the bound bale from chamber 74, it is necessary that the endgate 20 be raised to its position illustrated in FIG. 8. Such is accomplished by extending the piston and cylinder assemblies 38 to raise housing 10 and straighten the joints 50 of lost motion linkages 44. As such straightening occurs, the latches 60 are pulled from slots 66 on endgate 20, all without attempting to force endgate 20 out of its fully closed position. Once linkages 44 have become fully unbuckled with their joints 50 completely straightened, further extension of piston and cylinder assemblies 38 causes linkages 44 to pull downwardly on cranks 52, hence swinging endgate 20 about axis 22 into the fully raised position of FIG. 8. At this time, the housing 10 may be advanced, leaving the finished and bound bale resting on the ground.

It is interesting and important to note that the forming grates 118 and 120 are quite helpful during discharge of the finished bale; particularly the front grate 118. As endgate 20 is opened and pressure is relieved against the back of the bale, the springs 132 and 146 seek to return grates 118 and 120 to their original solid line positions of FIG. 3, hence shoving the bale rearwardly as housing 10 moves forwardly. Inasmuch as front grate 118 moves practically in a straight line rearwardly to its original position during this procedure, it has the most direct effect on the bale and forcefully ejects the same cleanly and quickly from housing 10.

Retraction of the piston and cylinder assemblies 38 allows the endgate 20 to be lowered back to its fully closed position, whereupon the linkages 44 once again become buckled as the latches 60 are reinserted into their slots 66. Further retraction of piston and cylinder assemblies 38 lowers the housing 10 to its working position as shown in FIG. 1. However, in the event that it is desired to travel with the machine over the road, it is preferable that housing 10 remain in a slightly raised position as shown in FIG. 7, at which time the linkages 48 remain slightly buckled and latches 60 remain within their slots 66. This maintains the lifters 108 sufficiently above the surface of the ground to avoid any accidental contact with structures which might damage tines 112.

Having thus described the invention, what is claimed as new and desired to be secured by Letters Patent is:

1. In a machine for forming a round hay bale by rolling a mass of hay along the ground through severed hay to progressively roll up the loose hay onto the mass, mechanism at the rear of the machine for picking up loose hay and adding it to the mass ahead of the mechanism, said mechanism comprising:
   upper and lower elongated, vertically spaced members extending transversely of the normal path of travel of the machine;
   means mounting said members for rotation about their longitudinal axes;
   means coupled with at least one of said members for driving the same about its axis;
   an endless, upright, flexible web looped around said members presenting a forwardmost and a rearmost stretch.
   said driving means being operable to normally move said forwardmost stretch upwardly during operation and said rearmost stretch downwardly; and
   a plurality of hay lifters on said web and projectable from the surface of the latter only as the web moves around said members, whereby to facilitate sweeping loose hay forwardly from the ground and lifting the same to said mass.

2. Mechanism as claimed in claim 1, wherein said web includes a series of individual, side-by-side belts each having a number of said lifters thereon.

3. Mechanism as claimed in claim 1, wherein each of said lifters is mounted to lie flatly against said web along the forwardmost and rearmost stretches thereof.

4. Mechanism as claimed in claim 1, wherein each lifter is elongated and is provided with means fastening the same by one end to the web, the opposite end of each lifter being free.

5. Mechanism as claimed in claim 4, wherein said fastening means is located at the normally leading end of each lifter respectively.

6. Mechanism as claimed in claim 5, wherein each lifter includes a pair of tines secured flatly against the web and converging toward said fastening means.

7. Mechanism as claimed in claim 6, wherein each tine has an outturned tip remote from said fastening means.

8. In a machine for forming round hay bales by rolling a hay mass along ground covered with loose hay:
   an open bottom housing including an endgate swingable between a position closing the rear of the housing for bale formation and a position opening the rear of the housing for finished bale discharge;
   a pair of ground wheels on opposite sides of the housing adapting the same for advancement over the loose hay;
   mechanism within said housing for forming a round bale as the housing passes over loose hay and the latter is picked up from the ground;
   power means between said ground wheels and the housing for raising and lowering the latter relative to the ground wheels to vary the height of said mechanism; and
   apparatus operably coupled with said endgate and responsive to raising the housing more than a predetermined amount to swing said endgate to said opening position.

9. In a machine as claimed in claim 8, wherein said housing is provided with a latch releasably holding said endgate in said closing position, said apparatus being coupled with said latch for releasing the same prior to swinging the endgate to the opening position.

10. In a machine as claimed in claim 8, wherein said apparatus includes lost motion linkage.

11. In a machine as claimed in claim 10, wherein said linkage is articulated presenting a joint which is bent when the endgate is in said closing position, said joint straightening as the housing is raised said predetermined amount.

12. In a machine as claimed in claim 10, wherein said ground wheels are each provided with a lift arm swingably mounting the wheels on said housing, said linkage interconnecting the endgate and said lift arms.

13. In a machine as claimed in claim 12, wherein said power means includes at least one fluid pressure piston and cylinder assembly interconnecting the housing and a lift arm.

14. In a machine for forming round bales by rolling a hay mass over ground covered with loose hay:
 a mobile, open bottom housing;
 mechanism at the rear of the housing for picking up loose hay through said open bottom as the housing passes over the hay;
 an upwardly concave, rear forming element extending forwardly from said mechanism adjacent the bottom of the housing; and
 an upwardly concave, front forming element extending rearwardly toward said mechanism adjacent the bottom of the housing and in overlapping relationship with said rear element for cooperating with the latter to define an expandable, arcuately topped forming chamber ahead of said mechanism and above said open bottom,
 said elements being oppositely swingable under resistance about front and rear transverse axes as a mass of hay is rolled into a larger bale within said chamber, and said axis of the front element being shiftable forwardly during said rolling action to expand the chamber fore-and-aft as well as vertically as the bale grows in size.

15. In a machine as claimed in claim 14, wherein said front element is provided with means for yieldably resisting said forward shifting of the front element.

16. In a machine as claimed in claim 15, wherein said yieldable means also resists upward swinging of said front element.

17. In a machine as claimed in claim 14, wherein said front element is provided with structure suspending the same for fore-and-aft swinging.

18. In a machine as claimed in claim 17, wherein said structure includes a pair of elongated hangers on opposite sides of said housing, each hanger being pivoted at its upper end to the housing and at its lower end to said front element.

19. In a machine as claimed in claim 18, wherein said housing is provided with a pair of front and rear stops for each of said hangers.

20. In a machine as claimed in claim 19, wherein said front element is provided with means yieldably biasing the hangers against their rear stops.

21. In a mobile round bale forming machine having a baling chamber:
 a rotary member carried in a position normally adjacent the ground and having an arcuate periphery;
 an elongated, flexible element looped around said member and movable lengthwise during rotation of the member,
 said element having a bale-engaging stretch extending across said chamber in disposition for engaging a bale forming in the chamber; and
 a series of elongated crop lifting devices mounted on said element with their longitudinal axes extending at least substantially parallel to that of the element,
 said devices being mounted to remain in said parallel relationship along said bale-engaging stretch but swing outwardly from said relationship as they move around said periphery of the member with the element.

22. In crop handling equipment as claimed in claim 21, wherein said element comprises a flat belt.

23. In crop handling equipment as claimed in claim 21, wherein each said device has a normally leading end attached to the element and a normally trailing end unattached to the element.

24. In crop handling equipment as claimed in claim 23, wherein each said device directly overlies said element.

25. In crop handling equipment as claimed in claim 23, wherein each said device is clamped flatly against the element at said leading end of the device.

26. In crop handling equipment as claimed in claim 25, wherein each said device includes a pair of side-by-side tines.

27. In crop handling equipment as claimed in claim 26, wherein said tines converge as the leading end of each device is approached.

28. In crop handling equipment as claimed in claim 27, wherein each tine has an outturned tip at said trailing end of the device.

29. In crop handling equipment as claimed in claim 28, wherein said tines are integrally connected at said leading end of the device.

* * * * *